United States Patent Office 2,713,756
Patented July 26, 1955

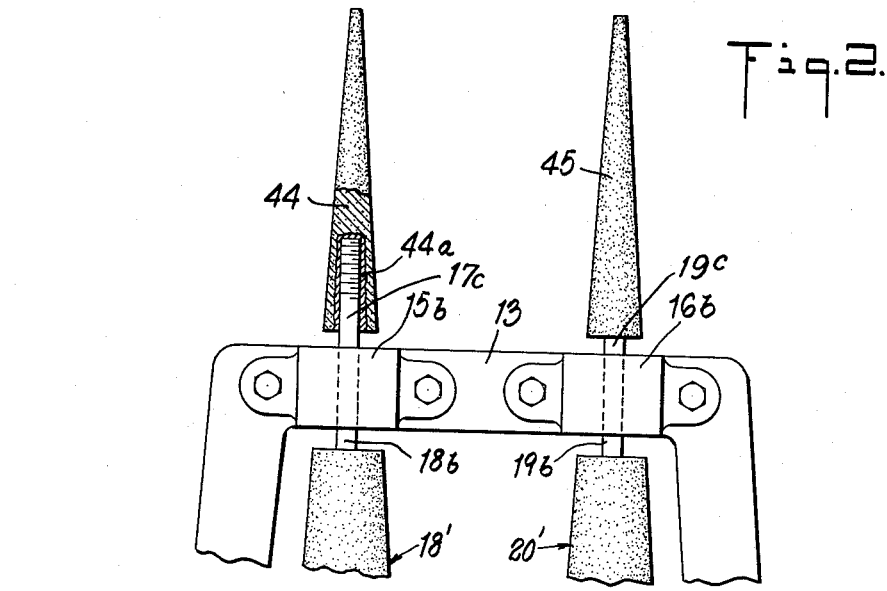
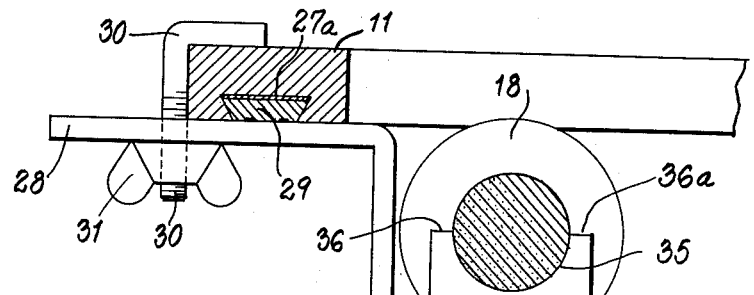
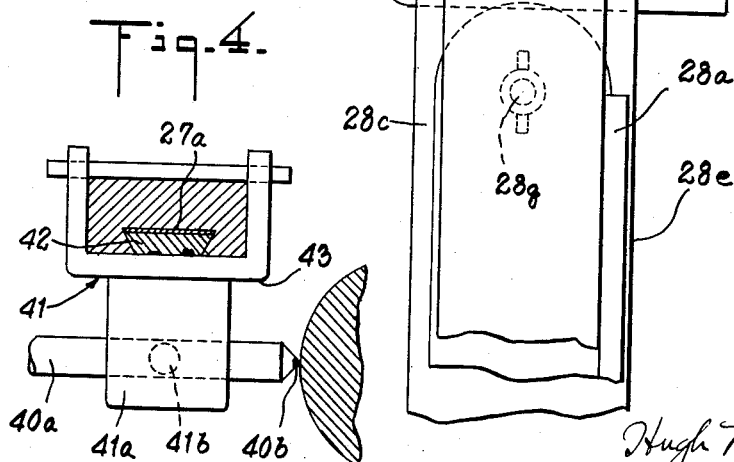

2,713,756

MACHINES FOR GRINDING CUTTING TOOLS HAVING RADIUS CUTTING EDGES

Hugh Milmore, Johnstown, Pa.

Application June 24, 1953, Serial No. 363,716

8 Claims. (Cl. 51—102)

This inventon relates to improvements in machines for grinding cutting tools having curved cutting edges known as radius cutting edges. Heretofore in the prior art such radius cutting edges on cutting tools, which usually require the formation in the tool of a cutting surface comprising a perfect half circle, have in machine shops been formed by utilizing the usual grind-stones and emery wheels, and such prior art method of producing curved cutting surfaces of the desired radius on cutting tools have been time consuming and very tedious.

Such cutting tools have a cutting surface of preferred half circular conformation of the desired size which must be accurately ground in the tool with a clearance below the curved cutting edge that should taper to a larger radius at the bottom surface of the tool, while the curvatures of the portions of the entire curved surface in the edge of the tool below said cutting edge will be concentric all the way from the top to the bottom of the ground surface.

One of the objects of this invention is to provide for machine shops, dye-making shops, wood working shops and hobbyists a grinding machine that will greatly facilitate the grinding of such curved cutting surfaces of any suitable radius on cutting tools, and which will enable such cutting edges of any desired degree or size of radius to be ground in the cutting tool in a time period, which is greatly reduced over the time required to produce such cutting tools, heretofore.

Another object of my invention is to produce a special machine having novel means for grinding such radius cutting tools that will avoid the time-consuming and piecemeal operations heretofore necessary and will enable the necessary grinding operation to be continuously controlled for any given radius and which will, without the skill heretofore necessary, produce a perfectly curved surface ground to the correct degrees with proper front and side clearances on the tool and will also cause the curved surface portion below the cutting edge to be concentric with the cutting edge and of correct radius.

Another object of this invention is to produce a grinding machine which will enable in a single and continuous operation a controlled and precise grinding of a radius surface to be produced in a suitable blank and this ground surface will be so accurate that a smoothly-tapered model piece of round material will fit snugly thereinto.

Another object of this invention is to provide a machine having grinding mechanism and cooperating indicating means by the use of which the radius of the cutting surface of the cutting tool may be ground at a given indicatable position in relation to the grinding mechanism, and may at all times during the grinding operation be fully controlled by the machine operator, whereby frequent measurements and checking difficulties formerly encountered by machinists in utilizing the shop grindstone method are eliminated.

Another object of my invention is to produce a grinding machine having grinding elements provided with a proper taper to produce tools with radius cutting surfaces of any suitable dimensions within the limit of the machine and that will enable grinding of a radius surface in much quicker time than has heretofore been possible by prior art methods.

Another object of this invention is to produce a grinding machine of the character specified that will be compact and easily operable, and may, by quick and easy manipulation, be set initially to produce any radius cutting surface within a wide range of dimensions and including those sizes which may now be considered as standard.

Still another object of my invention is to provide a machine of the type specified in which there is suitably mounted a plurality of tapered grinding elements, one of which may be used as a rough grinder and another as a finishing grinder that will produce in the tool the proper radius cutting edge as well as the necessary tapered clearances below the cutting edge thereof.

Another object of my invention is to arrange the grinding elements of the character specified in a frame having suitable scale graduations so arranged in relation to the taper of the grinding element and the curvature thereof at varying positions along the length of the tapered grinding element as to enable the workman immediately to set the machine to the specific taper and curvature which he desires on his cutting tool and which will thereupon enable the automatic grinding of such cutting edge and also simultaneously provide the tapered surface below the cutting edge.

Still another object of this invention is to provide in a machine of the type specified means by which the tapered grinding elements thereof may be readily, quickly and easily conditioned and kept in properly tapered form by the use of a suitable diamond or like cutting tool.

Still another object of this invention is to provide in combination with tapered grinding elements of the character specified a frame having tool supporting means so arranged as to enable the positioning of a tool to be ground in precise alignment with the axis of the grinding element, and thus enable the grinding in the tool of a radius of proper size or circumference and in proper alignment with the side edges of the tool.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:

Fig. 2 is a fragmentary view in front elevation of an end portion of the machine of Fig. 1 provided with a modification;

Fig. 3 is a cross-section of a frame member and grinding element on the line 3—3 of Fig. 1; and Fig. 4 is a cross-section on the line 4—4 of Fig. 1 showing in cross section a dressing tool and the machine frame member on which it is mounted.

Figure 1:
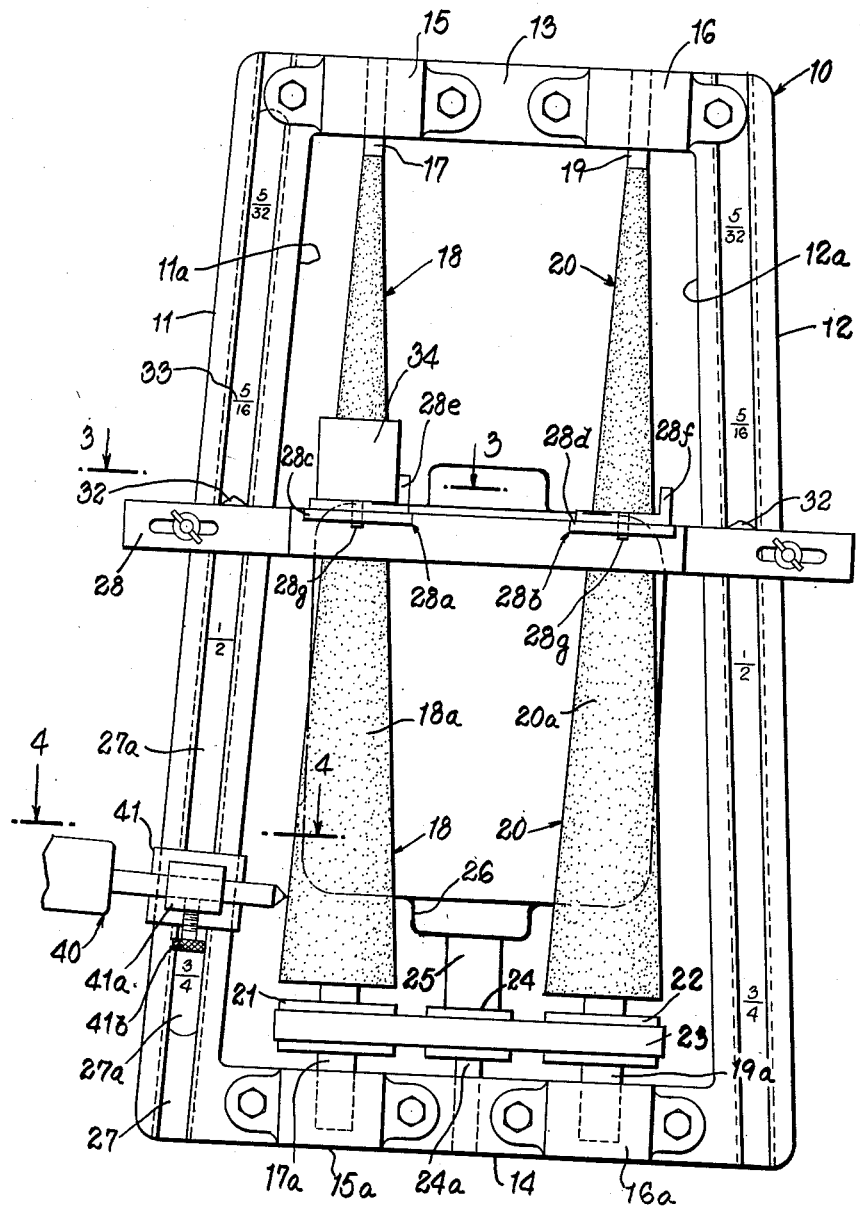
Fig. 1 is a view in front elevation of a grinding machine embodying my invention.

Referring now to these drawings which illustrate a preferred embodiment of my machine for grinding, 10 indicates a frame of generally quadrilateral or trapezoidal conformation, preferably composed of a suitable metal and comprising, as shown, longitudinal side members 11 and 12 connected at opposite ends with transverse end members 13 and 14, respectively, to form a mounting and supporting frame for one or more grinding elements. As illustrated, the transverse end members 13 and 14 are arranged in parallel relationship to each other and provided with two pairs of bearings 15—15a and 16—16a within which are mounted shafts or cores of a pair of grinding elements. As shown, upper and lower end-portions 17—17a and 19—19a of shafts or cores for the grinding elements 18 and 20 are mounted in the said pairs of bearings and each having tapered grinding surfaces 18a and 20a suitably mounted on said shafts or cores.

In the preferred embodiment of my invention shown, the frame member 14 may be considered the base of the grind-machine and the lower ends 17a and 19a of the shafts or cores are provided adjacent to said base member 14 with suitable means for rotating the same. As illustrated, said shafts are provided with pulleys 21—22, respectively, and these pulleys are provided with a belt 23 which is turned by a pulley 24 mounted on a shaft 24a in said base member between the two members of the pairs of grinding elements. The pulley 24 is suitably driven or rotated by a shaft 25 of an electric motor 26 shown in dotted lines and which is also preferably suitably mounted or held in the frame 10. Obviously, the motor 26 upon being energized from any suitable source, not shown, and started will cause the pulley 24 to be rotated, which will turn belt 23 to rotate the pulleys 21 and 22 which are mounted on the shaft 17a and 19a, and will consequently rotate the tapered grinding elements 18 and 20 which are composed of suitable abrasive material adapted for the grinding of metal, and particularly for the grinding of radius cutting edges in cutting tools.

In the preferred embodiment of my invention, one of these grinding elements preferably contains a rough grinding material for the purpose of providing initial rough grinding and the other is provided with a smoother grinding material which will enable a complete finishing of the surface to be ground.

In the preferred embodiment of my invention, the frame members 11 and 12 are arranged on opposite sides of the grinding elements, and preferably in suitably inclined relationship to each other. The inclination of these frame members, and particularly the longitudinal axis thereof, is preferably so disposed that each axis of a side member will be parallel with a properly tapered surface of one of the members 18 and 20 and each of these side members may be utilized as a guide for preparing and dressing the abrasive surface of the grinding element adjacent thereto.

In accordance with the preferred embodiment of my invention shown, the side members of the elements 11 and 12 are each provided with dove-tailed grooves 27 each preferably having embodied therein a dove-tailed ruler member 27a preferably extending substantially the full length of the dove-tailed groove 27. I preferably mount above the pair of dovetailed grooves 27 thus provided a work-guiding rail 28. This guide rail 28 is provided with a pair of dove-tailed projections 29, one at each end thereof, fitting into and slidable along one of the grooves 27. This work-guiding rail 28 is also provided at each end with a fastening element comprising an L-shaped bolt 30 having a screw-threaded portion 30a on which is mounted a wing nut 31 which, upon turning, is capable of fastening the work-guiding rail 28 at any suitable place along the mounting frame 10. The work-guiding rail in the embodiment shown is provided at opposite ends with pointer portions 32 and the ruler members within the frame elements 11 and 12 are provided with graduations 33, so that upon movement of the work-guiding rail 28 upwardly and downwardly along the dove-tailed grooves 27, the said member 28 may be accurately positioned at any suitable tapered portion of the members 18 and 20, thus enabling the guiding of the work which comprises a cutting tool 34 into proper position along one or the other of the members 18 and 20, and it will be obvious that by positioning the cutting tool 34 in proper position, an operator will be able to produce in such tool a radius cutting edge 35 of any suitable degree or size of radius, and will at the same time be able to produce in said tool any suitable clearances such as the clearances 36—36a, and also will provide below the cutting edge of necessary curved surface portion, which because of the taper of the grinding element will also be tapered and will be concentric with the cutting edge, and also will, because of such taper of the grinding element, be of the correct radius.

It is desirable to keep the grinding surfaces 18a and 20a in properly tapered relationship to enable accurate grinding and because of the parallelism to the frame members 11 and 12 I am enabled by a simple dressing operation to keep such grinding elements at proper taper. With this end in view, I preferably provide one or more dressing tools 40 and guide the same into contact with the tapered grinding surfaces. As illustrated, the dressing tool 40 has a spindle 40a slideably mounted in a suitable turret portion 41a of a dressing slide member 41 provided with a set screw 41b. Said slide member 41 is provided with a dove-tailed projection 42 adapted to slide within a groove 27 and also provided with an outer holder element 43 also slidable with the member 41 along the outer surface of said mounting frame members 11 and 12. The spindle 40a is slideable in turret 41a, which has a set screw 41b for adjustment and holding of the spindle in the turret and the outer end of the spindle is provided with a diamond or other suitable hard material at 40b that is adapted to dress the abrasive grinding surfaces 18 and 20 during their revolution in the frame 10 and at any particular section thereof along which the member 40 is moved in its mounting rail 41.

In the modification shown at Fig. 2 the shaft portions 18b and 19b are extended through bearings 15b—16b to produce extensions 17c—19c which are screw threaded and additional tapering grinding elements 44 and 45 (which are smaller in diameter and shorter in length than the grinding elements 18 and 20) are each provided with an internal screw threaded socket 44a and are mounted on the ends of the extensions of said shafts 18b—19b to project outwardly from the outer end of the frame for the purpose of enabling an intitial grinding of tapering character on a cutting tool, and if desired these additional grinding elements 44 and 45 may be used in a finishing operation.

In the preferred form of my invention shown, the work-guiding rail 28 is provided at a position in alignment with the axis of each of the grinding elements 18 and 20 with work-holders 28a—28b comprising base members 28c—28d aligned with the grinding elements 18 and 20 and flanged tool-rest plates 28e—28f which are, respectively, suitably mounted to turn on their base plates as shown in Figs. 3 and 4 and thus to enable a single work-rest assembly to be utilized for grinding radius cutting edges in tool members 34 of varying sizes or widths, it being understood that a cutting tool of narrower size or edge than the tool 34 shown may be aligned with the axis of the grinding element by a turning of the members 28e or 28f about its pivot 28g and may thus have a radius cutting edge properly ground and aligned with the axis of such narrower tool.

Operation of the device will from the above description be obvious to those skilled in the grinding art, and it will be apparent that radius cutting edges of varying sizes and radii may be ground easily and quickly as hereinabove stated.

Having described my invention, I claim:

1. In a machine for grinding cutting tools having curved cutting edges known as radius cutting edges, the combination with an elongated frame having spaced parallel end members provided with shaft-bearings and longitudinally disposed side members, a grinding element comprising a shaft rotatively mounted at opposite ends in said bearings and having fixedly mounted thereon between said opposite ends a shell of abrasive material provided with an abrasive grinding surface of tapering conformation, means for rotating said shaft in said bearings, and means for guiding a cutting tool at any given place along said tapered abrasive surface to produce in the tool a radius cutting edge of any suitable dimension.

2. In a machine for grinding cutting tools as claimed in claim 1, a construction in which the frame has the conformation of an isosceles trapezoid with inwardly-inclined sides extending parallel with the tapered abrasive surface of said grinding element.

3. In a machine for grinding cutting tools as claimed in claim 2, a construction in which the inwardly-inclined sides of the frame are provided with measuring indications indicating the degree of taper of the grinding element.

4. In a machine for grinding cutting tools as claimed in claim 2, a construction in which the frame has two bearings in each of its spaced parallel ends, two shafts are mounted in said bearings and each shaft is provided with shells of abrasive material having tapered abrasive surfaces.

5. In a machine for grinding cutting tools as claimed in claim 2, a construction in which the longitudinally disposed side members of the frame have means for slidably mounting therein a transversely-extending work holder.

6. In a machine for grinding cutting tools having curved cutting edges known as radius cutting edges, the combination with an elongated frame having spaced parallel end members and inwardly-inclined side members connected with said end members, each of said end members being provided with two bearings, two shafts mounted in said bearings in said end members and extending longitudinally in said frame between said side members, each shaft being provided with a shell of abrasive material having a tapered abrasive grinding surface, and means for slidably mounting in said side members a transversely-extending work holder.

7. In a machine for grinding cutting tools having curved cutting edges known as radius cutting edges, the combination with an elongated frame having spaced parallel end members and inwardly-inclined side members, each of said end members being provided with two bearings, two shafts mounted in said bearings in said end members and extending longitudinally in said frame between said side members, each shaft being provided with a shell of abrasive material having a tapered abrasive grinding surface, each of said two shafts having portions projecting beyond one end of the frame, and a shell of abrasive material mounted on each of said projecting portions and provided with tapered abrasive grinding surfaces.

8. In a machine for grinding cutting tools having curved cutting edges known as radius cutting edges, the combination with an elongated frame having spaced parallel end members provided with shaft-bearings and longitudinally disposed side members, a grinding element comprising a shaft rotatively mounted at opposite ends in said bearings and having fixedly mounted thereon between said opposite ends a shell of abrasive material provided with an abrasive grinding surface of tapering conformation, means for rotating said shaft in said bearings comprising an electric motor mounted in said frame and having a driving connection with said shaft, and means operable during rotation of said shaft and abrasive shell by said electric motor for guiding a cutting tool at any given place along said tapered abrasive surface to produce in the tool a radius cutting edge of any suitable dimension.

References Cited in the file of this patent

UNITED STATES PATENTS

| | | |
|---|---|---|
| 159,526 | Otis | Feb. 9, 1875 |
| 726,974 | McLeran | May 5, 1903 |
| 987,589 | Mummert | Mar. 21, 1911 |
| 1,177,483 | Carter | Mar. 28, 1916 |
| 1,259,494 | Downer | Mar. 19, 1918 |
| 1,948,859 | Jones | Feb. 27, 1934 |